US006915122B2

(12) United States Patent
Meradi

(10) Patent No.: US 6,915,122 B2
(45) Date of Patent: Jul. 5, 2005

(54) METHOD FOR CALIBRATION OF A KEYLESS ENTRY SYSTEM FOR A MOTOR VEHICLE

(75) Inventor: Omar Meradi, Turin (IT)

(73) Assignee: Valeo Electronique, Creteil (FR)

( * ) Notice: Subject to any disclaimer, the term of this patent is extended or adjusted under 35 U.S.C. 154(b) by 842 days.

(21) Appl. No.: 09/950,806

(22) Filed: Sep. 13, 2001

(65) Prior Publication Data

US 2002/0160720 A1 Oct. 31, 2002

(30) Foreign Application Priority Data

Sep. 13, 2000 (FR) ........................................... 00 11659

(51) Int. Cl.[7] ................................................ H04B 1/10

(52) U.S. Cl. ...................... 455/297; 455/264; 455/41.3; 340/426.36; 180/287; 307/10.1

(58) Field of Search .......................... 455/91, 99, 26.1, 455/152.1, 296, 297, 410, 411, 418–420, 41.2, 41.3; 340/426.1, 426.36; 343/711–713; 307/10.1, 10.2; 180/271, 287

(56) References Cited

U.S. PATENT DOCUMENTS 4,755,823 A 7/1988 Ohe et al.
5,396,255 A 3/1995 Durkota et al.
2002/0014859 A1 * 2/2002 Boulesteix .................. 315/219
2002/0160720 A1 * 10/2002 Meradi ...................... 455/67.4

FOREIGN PATENT DOCUMENTS

EP 0 901 183 A2 3/1999
EP 1189302 A1 * 3/2002 ............ H01Q/1/32

* cited by examiner

*Primary Examiner*—Roland G. Foster
(74) *Attorney, Agent, or Firm*—Liniak, Berenato & White

(57) ABSTRACT

Method for calibrating a motor vehicle hands-free access system comprising a control unit (UC) with an emitting antenna (AE) and an antenna controller (PA), consists in:

1. sending to the control unit (UC), from a measurement apparatus (AM) equipped with a receiving antenna (AR) connected to the control unit (UC) via a wire link (LF), a message to configure the control unit (UC) in calibration mode,
2. transmitting a signal via said emitting and receiving antennas (AE, AR) to said measurement apparatus (AM),
3. measuring characteristics of the received signal, comparing them with reference values and sending calibration data via the wire link (LF),
4. on receipt of the data, modifying the parameters of the antenna controller (PA). Using this method, it is possible to correct certain operating defects of the hands-free access systems through an operation at the end of the motor vehicle assembly line.

2 Claims, 1 Drawing Sheet

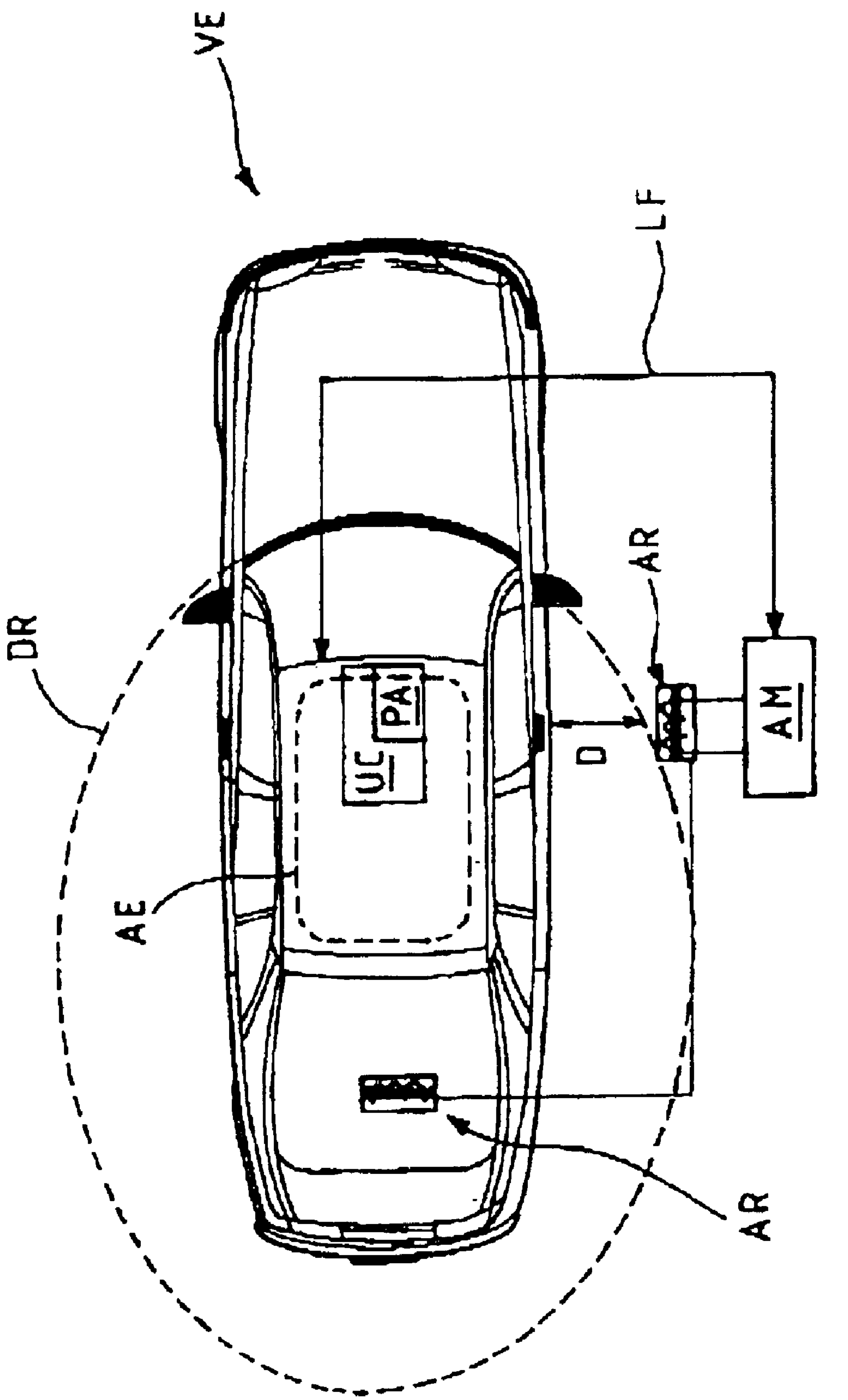
VE
LF
AR
DR
PA1
UC
AM
D
AE
AR

METHOD FOR CALIBRATION OF A KEYLESS ENTRY SYSTEM FOR A MOTOR VEHICLE

The invention relates to a method for calibrating a hands-free access system comprising an authentication and control unit mounted in a vehicle with at least one antenna that emits an electromagnetic field and an antenna controller, and a portable identification member capable of communicating from a distance with the authentication and control unit to be authenticated.

The invention relates to motor vehicle hands-free access systems designed so that a user wearing or carrying an identification member can unlock his vehicle in order to enter it and then start it, without having to operate a key or a remote control. In such an access system, the authentication and control unit is capable of communicating with the identification member by the exchange of electromagnetic signals so as to authenticate the badge in order to command the unlocking of the vehicle and/or to authorize the starting of the vehicle.

In this kind of access system, the emitting antenna, which is a winding of electric conductors capable of emitting an electromagnetic signal, is generally mounted near metal parts of the vehicle, and this in particular tends to modify the impedance of this emitting antenna, and therefore its range. It has thus been found that, after fitting, these hands-free access systems may exhibit operating defects such as, for example, an inadequate range of the electromagnetic signal emitted by the emitting antenna of the vehicle.

The purpose of the invention is to overcome this drawback.

To this end, the subject of the invention is a method for calibrating a hands-free access system comprising an authentication and control unit mounted in a vehicle with at least one antenna that emits an electromagnetic field and an antenna controller, and a portable identification member capable of communicating from a distance with the authentication and control unit to be authenticated, which method consists in the following steps:

1. sending to the authentication and control unit, from a measurement and control apparatus equipped with an antenna for receiving an electromagnetic field, connected to the authentication and control unit via wire link, a message to configure the authentication and control unit in a calibration mode,
2. on receipt of the message, generating a signal and transmitting it from the authentication and control unit via said emitting and receiving antennas to said measurement and control apparatus,
3. measuring electromagnetic and spectral characteristics of said signal received on the receiving antenna in the measurement and control apparatus, comparing them with reference values and sending calibration data to the authentication and control unit via the wire link if the measured characteristics do not correspond to the reference values,
4. on receipt of the calibration data by the authentication and control unit, modifying the operating parameters of the antenna controller.

A method such as this means that operating defects in a hands-free access system can be corrected at the end of the vehicle assembly line or alternatively at a dealership in the case of a replacement of an access system, and this can be done in a very short operating time.

According to one preferred embodiment of the method according to the invention, in step 4, the operating parameters modified are a duty cycle and/or a peak intensity in the emitting antenna and/or emission frequency values. In this way, it is possible to modify the most relevant operating parameters in order to improve the range of the electromagnetic field emitted by the emitting antenna and thus meet the specification required by the manufacturer.

The invention will now be described in greater detail and with reference to the appended drawing which illustrates by way of non-limiting example one embodiment thereof The single FIGURE is a schematic depiction of a vehicle equipped with a hands-free access system in the process of calibration.

The single FIGURE shows a vehicle VE equipped with a hands-free access system. This access system comprises an authentication and control unit UC with an antenna controller PA intended to generate a current in an emitting antenna AE with a view to producing an electromagnetic signal. The emitting antenna AE here is cited in the roof of the vehicle VE, so as to emit an electromagnetic signal with a radiation pattern DR extending around the vehicle VE. This authentication and control unit also comprises one or more receiving antennas, not depicted, and which are intended to receive data from the identification member. Thus, the authentication and control unit UC is capable of exchanging data with an identification member worn or carried by a user, with a view to authenticating him so as to unlock the vehicle and/or to allow the vehicle to be started.

In order to carry out calibration using the method according to the invention, the authentication and control unit UC is connected to a measurement and control apparatus AM by a wire link LF so as to be able to receive data from the measurement and control apparatus AM via this link. This measurement and control apparatus AM is connected to one or more receiving antennas AR so as to receive electromagnetic signals emitted by the hands-free access system. This measurement and control apparatus AM may, for example, comprise a computer for monitoring parameters, storing data, and controlling calibration. A computer such as this is connected to the receiving antennas AR and to the wire link FL via an input/output board. More specifically, the receiving antennas AR are intended to be used separately, so as, for example, to carry out an initial calibration using one receiving antenna arranged outside the vehicle, then a second calibration operating the receiving antenna situated inside the vehicle.

By virtue of the wire link FL, the measurement and control apparatus AM is able, in a first step, to send a message in the form of an electric signal to the authentication and control unit UC so as to configure the latter in calibration mode. In this method, calibration can be performed only with a wire link, as this constitutes a security measure against the risk of remote hacking of such hands-free access systems and against the risk of electromagnetic disturbance while the method is being performed.

In a second step which begins upon receipt of this message, the authentication and control unit UC is programmed to emit, on its emitting antenna AE, an electromagnetic signal so that this signal can be received by the measurement and control apparatus AM at a receiving antenna AR. More specifically, this receiving antenna AR is a calibrated antenna placed a predefined distance D away from the vehicle VE, so that the electromagnetic signal received in this antenna serves as base data for calibrating the access system. The AM thus simulates the operation of the portable identification member. In this context, the distance D, the height and the orientation of the receiving antenna will be adjusted to best correspond to predefined standard calibration conditions.

In a third step, the measurement and control apparatus AM measures certain electromagnetic and spectral characteristics of the electromagnetic signal. Depending on its electrical and magnetic components, these characteristics could be the emission frequencies of the access system, the amplitude of the electromagnetic field received or alternatively the duty cycle of the periodic signal, these being factors which govern the sensitivity of the identification member to the electromagnetic signals emitted by the access system. More specifically, the measurement and control apparatus could first of all record the signal received at its receiving antenna AR, then analyze this recording in order therefrom to deduce the characteristics of the electromagnetic signal emitted. By comparing these measured characteristics with reference values, the measurement and control apparatus chooses calibration data intended for the controller of the emitting antenna AE. These calibration data are chosen so that the signals emitted by the recognition device has characteristics that correspond to the reference values. More specifically, the choice of calibration data may be made by consulting tables of data pre-recorded in the measurement and control apparatus. Thus, the measurement and control apparatus AM may send these new calibration data to the authentication and control unit UC via the wire link LF.

In a fourth step that corresponds to the receipt of these calibration data, the authentication and control unit will modify the operating parameters of the antenna controller PA. More specifically, these calibration data could, for example, be two emission frequencies, a duty cycle, and a datum value of the strength of the current in the emitting antenna AE. The authentication and control unit UC is programmed to modify the operating parameters of the antenna controller on the basis of the calibration data received.

These operating parameters could be the duty cycle of the signals emitted, so as to modify the peak strength of the current in the antenna so as to influence the range of the magnetic field emitted, the value of the peak current in the event that the controller is capable of modifying the nominal voltage applied to the terminals of the emitting antenna, or alternatively the emission frequencies so as to tune them to the resonant frequency of the antenna. The modification of the operating parameters of the antenna controller could be the inputting of new variables into a program that generates a control signal for modifying a duty cycle or the emission frequencies, or alternatively modification of the input voltages of the antenna controller.

These four steps may be repeated several times so as to further refine the calibration of the device until the required characteristics of the electromagnetic field are obtained.

In the case of access systems which also comprise a second emitting antenna radiating inside the vehicle and intended to ensure that the identification member is present inside the vehicle in order to allow the latter to be started, the method will need to be applied a second time, placing the receiving antenna AR inside the vehicle with a view to calibrating the controller of this second antenna.

As an alternative, the measurement and control apparatus AM could also emit an electromagnetic field in such a way as to simulate an identification member, with a view to checking that the sensitivity of the recognition device to the receipt of electromagnetic signals emitted by an identification member is satisfactory.

As can be seen, using the method according to the invention, certain operating defects of a hands-free access system can be corrected using a measurement and control apparatus by connecting this apparatus to the authentication and control unit and then by running an automatic calibration sequence so that this correction can be simple and quick. Calibration may thus be performed at the end of the assembly line, or alternatively at a dealership after components of the hands-free access system of a vehicle have been replaced.

Likewise, an identical method, for calibrating the internal antenna which will be used to allow the vehicle to be started if the portable identification member is detected inside the vehicle can be used. The AM can be moved to certain critical points in the vehicle in order to carry out the method.

What is claimed is:

1. A method for calibrating a hands-free access system comprising an authentication and control unit mounted in a vehicle with at least one antenna that emits an electromagnetic field and an antenna controller, and a portable identification member capable of communicating from a distance with the authentication and control unit to be authenticated, which method consists in the following steps:

A. sending to the authentication and control unit, from a measurement and control apparatus equipped with an antenna for receiving an electromagnetic field, connected to the authentication and control unit via wire link, a message to configure the authentication and control unit in a calibration mode, B. on receipt of the message, generating a signal and transmitting it from the authentication and control unit via said emitting and receiving antennas to said measurement and control apparatus, C. measuring electromagnetic and spectral characteristics of said signal received on the receiving antenna in the measurement and control apparatus, comparing them with reference values and sending calibration data to the authentication and control unit via the wire link if the measured characteristics do not correspond to the reference values, D. on receipt of the calibration data by the authentication and control unit, modifying the operating parameters of the antenna controller.

2. The method as claimed in claim 1 in which, in step D, the operating parameters modified are a duty cycle and/or a peak intensity in the emitting antenna and/or emission frequency values.

* * * * *